US009432197B2

(12) United States Patent
Naganuma et al.

(10) Patent No.: US 9,432,197 B2
(45) Date of Patent: Aug. 30, 2016

(54) WIRELESS COMMUNICATIONS DEVICE AND AUTHENTICATION PROCESSING METHOD

(75) Inventors: Ken Naganuma, Yokohama (JP); Toru Owada, Yokohama (JP); Eriko Ando, Yokohama (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 609 days.

(21) Appl. No.: 13/580,564

(22) PCT Filed: Feb. 22, 2011

(86) PCT No.: PCT/JP2011/053782
§ 371 (c)(1),
(2), (4) Date: Aug. 22, 2012

(87) PCT Pub. No.: WO2011/105350
PCT Pub. Date: Sep. 1, 2011

(65) Prior Publication Data
US 2012/0311340 A1    Dec. 6, 2012

(30) Foreign Application Priority Data
Feb. 24, 2010   (JP) ................................ 2010-038874

(51) Int. Cl.
*H04L 29/00* (2006.01)
*H04L 9/32* (2006.01)
(Continued)

(52) U.S. Cl.
CPC ............. *H04L 9/3242* (2013.01); *G06F 21/35* (2013.01); *G06F 21/74* (2013.01); *H04L 63/08* (2013.01); *H04L 63/123* (2013.01); *G06F 2221/2105* (2013.01); *H04L 2209/80* (2013.01)

(58) Field of Classification Search
CPC ......... H04L 63/205; H04L 9/14; H04L 9/16; H04W 48/04; H04W 12/06
See application file for complete search history.

(56) References Cited

U.S. PATENT DOCUMENTS 6,108,583 A * 8/2000 Schneck et al. ................... 700/9
6,505,301 B1 * 1/2003 Matyas et al. ................. 713/169
(Continued)

FOREIGN PATENT DOCUMENTS

JP     04-200126 A    7/1992
JP     2003-067340 A  3/2003
(Continued)

OTHER PUBLICATIONS

Tatsuya Baba, "Get the point of the Internet! Complete explanation of DNS structure", the seventh round, Authentication of DNS message by TSI and SIG (0), Network World, Japan, IDG Japan Co., Ltd, Feb. 1, 2003, vol. 8, No. 2, pp. 72-77.
(Continued)

Primary Examiner — Brandon Hoffman
Assistant Examiner — Michael D Anderson
(74) Attorney, Agent, or Firm — Mattingly & Malur, PC

(57) ABSTRACT

An authentication method is provided which is capable of performing message authentication within an allowable time regardless of the magnitude of the number of messages and performing message authentication high in accuracy within a range for which the allowable time allows. Upon transmission by wireless communications with another mobile or a fixed station, a message authentication code of communication data and a digital signature are generated (S200 and S300). The generated message authentication cod and digital signature are transmitted with being added to the communication data. Upon reception, whether authentication should be done using either one of the message authentication code and the digital signature included in received information is determined according to its own state for the authentication (S400 and S500). This state includes, for example, a load state of a central processing unit or the like that performs an authentication process.

12 Claims, 10 Drawing Sheets

(51) Int. Cl.
*G06F 21/35* (2013.01)
*G06F 21/74* (2013.01)
*H04L 29/06* (2006.01)

(56) References Cited

U.S. PATENT DOCUMENTS

| | | | | |
|---|---|---|---|---|
| 6,842,860 | B1* | 1/2005 | Branstad et al. | 713/170 |
| 7,602,918 | B2* | 10/2009 | Mizikovsky et al. | 380/270 |
| 7,716,721 | B2* | 5/2010 | Zavalkovsky et al. | 726/2 |
| 7,770,009 | B2* | 8/2010 | Miyazaki et al. | 713/170 |
| 8,005,460 | B2* | 8/2011 | Chen et al. | 455/411 |
| 2003/0051147 | A1 | 3/2003 | Maeda et al. | |
| 2004/0236819 | A1* | 11/2004 | Anati et al. | 709/200 |
| 2008/0031446 | A1* | 2/2008 | Suga | 380/44 |
| 2009/0254754 | A1 | 10/2009 | Bellur et al. | |
| 2010/0281270 | A1 | 11/2010 | Miyazaki et al. | |
| 2011/0066859 | A1* | 3/2011 | Iyer et al. | 713/176 |

FOREIGN PATENT DOCUMENTS

| | | |
|---|---|---|
| JP | 2005-318299 A | 11/2005 |
| JP | 2006-129432 A | 5/2006 |
| JP | 2006-261955 A | 9/2006 |
| JP | 2008-60809 A | 3/2008 |
| JP | 2009-89045 A | 4/2009 |

OTHER PUBLICATIONS

IEEE Trial-Use Standard for Wireless Access in Vehicular Environments-Security Services for Applications and Management Messages; EEE Std 1609.2, Jul. 6, 2006, New York, NY, 117 pp.

D. Fukaya et al., "Evaluation of a scheme for checking the believability of location-dependent information generated by isolated vehicles in VANETs", IPSJ SIG Notes, Feb. 26, 2009, vol. 2009, No. 20, pp. 151-156.

S. IKeno et al., "Gendai Ango Riron", 1st Ed., 6th print, The Institute of Electronics, Information and Communication Engineers, Nov. 15, 1997, pp. 217-225 and pp. 235-236.

E. Okamoto, "Ango Riron Nyumon", 1st Ed., 3rd print, Kyoritsu Shuppan Co., Ltd., Oct. 1, 1996, pp. 129-136.

Japanese Office Action received in corresponding Japanese Application No. 2014-015361 dated Sep. 11, 2014.

Chinese Office Action received in corresponding Chinese Application No. 201180010841 dated Aug. 1, 2014.

* cited by examiner

Fig.11

(DATA FORMAT OF MESSAGE WITH SIGNATURE AND MAC)

| MESSAGE DATA | VEHICLE ID | SIGNATURE | MAC VALUE |

WIRELESS COMMUNICATIONS DEVICE AND AUTHENTICATION PROCESSING METHOD

TECHNICAL FILED

The present invention relates to a wireless communications device which performs an authentication process at a self-driven mobile which performs wireless communications with another mobile or a fixed station, and further to an authentication processing method applied to the wireless communications device. The present invention relates to, for example, a technology effective in improving safety for wireless communications when applied to protect against spoofing and tampering of a message at wireless communications performed between vehicles or between a vehicle and a roadside, etc.

BACKGROUND ART

In recent years, road vehicle-to-vehicle communication services have widely been used which deliver jam information, security/safety information, etc. from a wireless device installed on the roadside to an in-vehicle wireless device. Improving the accuracy of jam information and security/safety information by transmitting vehicle information from the in-vehicle wireless device to the roadside wireless device in reverse has been discussed. Further, a study of communications between respective vehicles that share jam information and security/safety information on a self-reliant basis by performing communications directly or on a multi-hop basis between the vehicles has also been carried out actively.

As such a wireless communication technology spreads, there is a need to confirm whether a received message is being tampered on a communication channel or whether a malicious person impersonates a message transmitter.

There have heretofore been known several technologies which protect against spoofing, tampering, etc. upon wireless communications and perform safety communications. As one of them, there is known a public key encryption method which performs encryption and decryption using keys different between a message transmitter and a message receiver. In the public key encryption method, keys set as a pair of two keys are used unlike a common key encryption method. One of them is a public key being on public view, and the other thereof is a secret key recognized by the very person alone. The paired keys have a feature that a message encrypted by one of them can be decrypted only by another key. Further, in order to estimate a secret key from a public key and other public information, an immense amount of calculation time is required at an actual computer resource, and high confidentiality can be achieved.

When it is desired to prevent spoofing and tampering by using such a feature, a message sender encrypts a message or its hash value (also called message digest) by a secret key known by the very person alone and transmits it. A receiver having received the message performs decryption of the message or its hash value by using a sender's public key. If it is possible to properly decrypt it by the sender's public key at this time, it is confirmed that the message sender is a person that knows a sender's secret key, i.e., the very person. It is also confirmed from the fact that decryption has properly been done, that tampering has not been performed on a communication channel.

In general, authentication is action for confirming the validity of a target. Message authentication is a procedure for ensuring that a message has not been changed. As methods for this message authentication, there are known a method using a message authentication code (MAC: Message Authentication Code) based on a common key encryption method, and a method using a digital signature based on a public key encryption method. The common key encryption method is an encryption method in which a key used in encryption and a key used in decryption are the same. The public key encryption method is an encryption method for performing encryption using his or her own secret key and performing decryption using a public key opened to the other party as described above.

The message authentication code is, for example, a code obtained by inputting a common key and a message of an arbitrary length to be authenticated to a MAC value generating function as inputs.

The digital signature is, for example, a code obtained by inputting a message (or message digest) of an arbitrary length to be authenticated and a secret key to a signature generating function. The message digest is generated by, for example, passing a message through a one-way hash function.

There has been described in a Patent Document 1, a vehicle-to-vehicle authentication technology using a message authentication code based on a common key encryption method.

There has been described in a Non-Patent Document 1, an ECDSA (electronic signature method using elliptic curve cryptography) as an authentication method using a digital signature based on a public key encryption method.

RELATED ART DOCUMENTS

[Patent Document]
[Patent Document 1] Japanese Unexamined Patent Publication Laid-Open No. 2008-60809
[Non-Patent Document 1] IEEE Trial-Use Standard for Wireless Access in Vehicular Environments—Security Services for Applications and Management Messages

DISCLOSURE OF THE INVENTION

Problems to be Solved by the Invention

It has been manifested by the present inventors that when message authentication using a public key encryption method is performed between vehicles or road vehicles, the following problem should be taken into consideration. The problem is a delay time taken for the next process, which is allowed upon execution of the message authentication.

For example, there have been discussed, for example, "Collision Avoidance Services" that mutual position information and velocity information are transmitted and received between vehicles as services related to the security and safety to thereby avoid collisions therebetween. It is necessary that in realizing such services, each vehicle performs generation/verification of a message instantaneously with the occurrence of an event to thereby determine a process for the message. There has however been a demand for a high-speed message authentication method since the allowable delay time (total processing time allowed between the occurrence of the event and the completion of the message process) is limited.

Although there has been proposed in the Non-Patent Document 1, the ECDSA (electronic signature method using elliptic curve cryptography) as the message authentication method, a problem arises in that since it take time to generate and verify a message, it becomes hard to complete processing within the allowable delay time with an increase in the number of messages. In particular, broadcast-type messages relative to all peripheral vehicles increase as the feature of vehicle-to-vehicle communications, so that the number of verification of messages increases in proportional to an increase in the number of communication nodes existing circumferentially.

When an encryption/decryption process is performed using a secret key being a common key as in the Patent Document 1, the secret key is shared within a prescribed group and message authentication is performed using the hash value of the secret key, so that a message cannot be transmitted to other than members in the group. Since an attempt is made to cope with the message authentication only by the message authentication code based on the secret key, the message authentication using the public key such as the ECDSA or the like cannot be used either as needed.

An object of the present invention is to provide an authentication method capable of performing message authentication within an allowable time regardless of the magnitude of the number of messages and performing message authentication high in accuracy in a range for which the allowable time allows, and further a wireless communications device to which the authentication method is applied.

The above, other objects and novel features of the present invention will become apparent from the description of the present specification and the accompanying drawings.

Means for Solving the Problems

A summary of a typical one of the inventions disclosed in the present application will be explained in brief as follows:

Upon transmission by wireless communications with another mobile or a fixed station, a message authentication code of communication data and a digital signature are generated. The generated message authentication code and digital signature are transmitted with added to the communication data. Upon reception, whether authentication should be performed using either one of the message authentication code and the digital signature included in received information is determined according to its own state for the authentication. This state includes, for example, a load state of a central processing unit that performs an authentication process.

An authentication process using a digital signature relatively large in the load of data processing, and an authentication process using a message authentication code relatively low in the load of the data processing can be used properly according to its own state for authentication in a range for which the time allowable for the authentication process allows.

Since the authentication using the digital signature is available, a common key necessary for the message authentication code can also be received from outside through a message encrypted by a public key encryption method. Thus, authentication based on the message authentication code can be performed by appropriately obtaining the necessary common key.

Effects of the Invention

Advantageous effects obtained by a typical one of the inventions disclosed in the present application will be descried in brief as follows:

Message authentication can be performed within an allowable time regardless of the magnitude of the number of messages, and high-accuracy message authentication can be performed in a range for which the allowable time allows.

BRIEF DESCRIPTION OF THE DRAWINGS

FIG. 11 is a format diagram illustrating a format of communication data in which a digital signature, a message authentication code and a vehicle ID are attached to a message.

BEST MODE FOR CARRYING OUT THE INVENTION

1. Summary of the Embodiments

Figure 1:
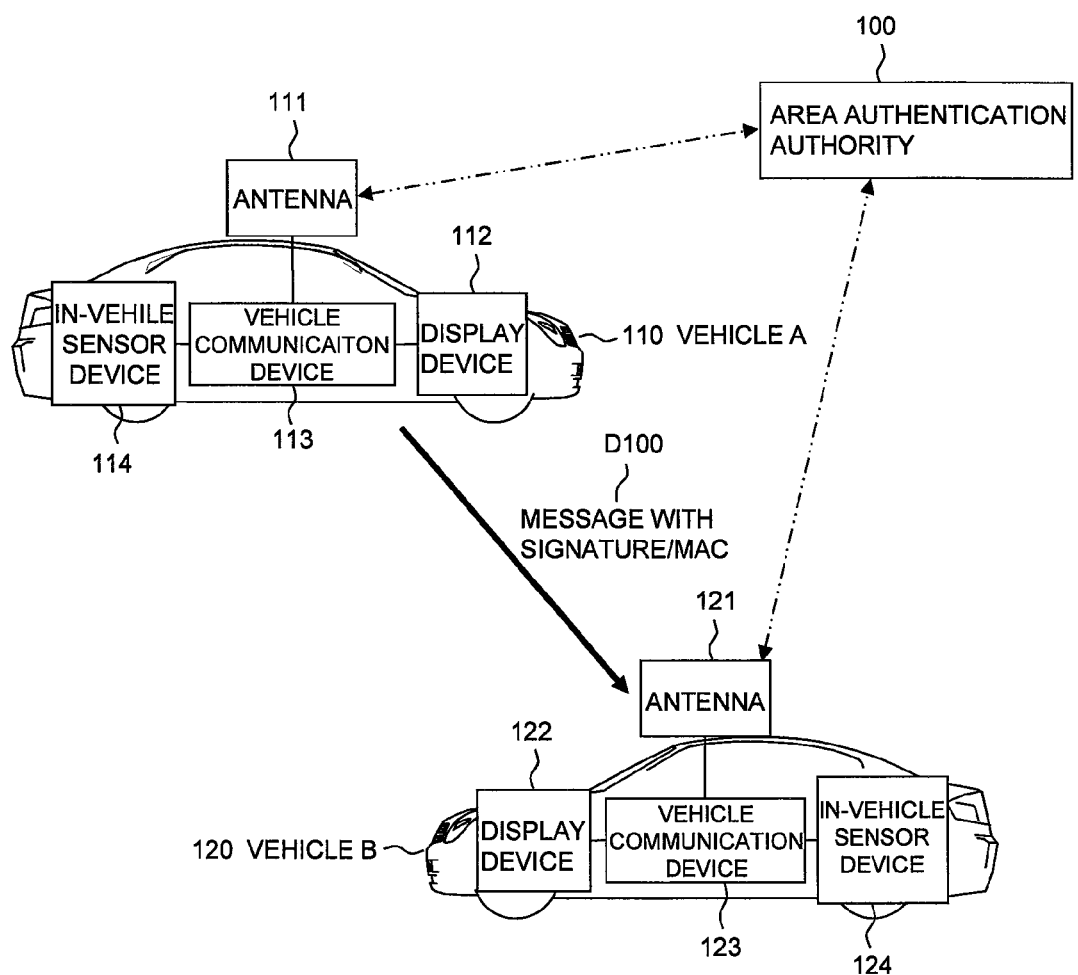
FIG. 1 is a system configuration diagram showing a mode for carrying out wireless communications in a system to which a communication data authentication method according to the present invention is applied.

A summary of typical embodiments of the invention disclosed in the present application will first be explained. Reference numerals of the accompanying drawings referred to with parentheses in the description of the summary of the typical embodiments only illustrate elements included in the concept of components to which the reference numerals are given.

[1] A wireless communications device (113, 123) according to a typical embodiment of the present invention is a device which performs an authentication process at a self-driven mobile that performs wireless communications with another mobile or a fixed station. The device executes a first process (S200, S300) for generating a message authentication code of communication data using a common key shared between the self-driven mobile and another mobile or the fixed station and generating a digital signature using a secret key inherent in the self-driven mobile itself and for transmitting the generated message authentication code and digital signature with being added to the communication data, and a second process (S400, S500) for receiving information transmitted from another mobile or the fixed station and determining according to its own state for authentication whether the authentication should be done using either one of a message authentication code and a digital signature included in the received information, to thereby perform the authentication.

According to this, an authentication process using a digital signature relatively large in the load of data processing, and an authentication process using a message authentication code relatively low in the load of the data processing can be used properly according to its own state for authentication in a range for which an allowable time for the authentication process allows. It is thus possible to perform message authentication within the allowable time regardless of the magnitude of the number of messages and perform high-accuracy message authentication in a range for which an allowable time allows.

Further, since the authentication using the digital signature is available, the common key necessary for the message authentication code can also be received from outside through a message encrypted by a public key encryption method. Thus, the authentication based on the message authentication code can be performed by appropriately obtaining the necessary common key.

[2] In the wireless communications device according to the paragraph 1, the second process is a process for executing an authentication request generating function assuming a value indicative of the state to be an argument to thereby generate an authentication required value. The authentication required value is data indicative of whether an authentication process using a message authentication code is necessary or not, and whether an authentication process using a digital signature is necessary or not. Thus, control as to which authentication process should be done becomes simple.

[3] The wireless communications device according to the paragraph 2 has a central processing unit. The value indicative of the state is a value corresponding to a state of a load of the central processing unit that performs an authentication process as a reception side. Thus, it is possible to plainly determine an authentication process that is within the time allowable for the authentication process.

[4] In the wireless communications device according to the paragraph 3, when the load of the central processing unit is large, the second process determines to need the authentication process using the message authentication code and not to need the authentication process using the digital signature. When the load of the central processing unit is low, the second process determines not to need the authentication process using the message authentication code and to need the authentication process using the digital signature.

[5] In the wireless communications device according to the paragraph 2, the value indicative of the state is a value corresponding to the strength and weakness of a correlation between information newly received as a target for the authentication process and history information about communications already received and subjected to the completion of the authentication process. Thus, the control of omitting a substantially needless authentication process and sorting data throughput to another authentication process becomes easy.

[6] In the wireless communications device according to the paragraph 5, when the correlation is strong, the second process determines to need the authentication process using the message authentication code and not to need the authentication process using the digital signature. When the correlation is weak, the second process determines not to need the authentication process using the message authentication code and to need the authentication process using the digital signature.

[7] In the wireless communications device according to paragraph 2, the value indicative of the state is a value corresponding to a relation of distance to another mobile or a fixed station on the transmission side. Thus, a substantially needless authentication process relative to a grasped meaningless one like a distant vehicle at a collision avoidance process or the like is omitted, and hence control on the sorting of data throughput to another authentication process becomes easy.

[8] In the wireless communications device according to the paragraph 7, when the relation of distance is established far, the second process determines to need the authentication process using the message authentication code and not to need the authentication process using the digital signature. When the relation of distance is established close, the second process determines not to need the authentication process using the message authentication code and to need the authentication process using the digital signature.

[9] In the wireless communications device according to the paragraph 8, the second process generates the relation of distance, based on sensor information acquired by a sensor device of the self-driven mobile or based on a result of processing of communication data received by a communication application of the self-driven mobile.

[10] The wireless communications device according to the paragraph 1 further executes a third process for outputting a request for the message authentication code from the self-driven mobile and receiving by the self-driven mobile, the message authentication code issued by an authentication authority receiving the request therein when the authentication authority performs an authentication process in response to the request to thereby determine validity thereof.

[11] In the wireless communications device according to the paragraph 10, the message authentication code is encrypted by a public encryption key method. Further, the third process includes a process for decrypting the received message authentication code.

[12] An authentication processing method according to another embodiment of the present invention is an authentication processing method suitable for use in a self-driven mobile that performs wireless communications with another mobile or a fixed station. The authentication processing method includes a first process for generating a message authentication code of communication data using a common key shared between the self-driven mobile and another mobile or the fixed station and generating a digital signature using a secret key inherent in the self-driven mobile itself and for transmitting the generated message authentication code and digital signature by being added to the communication data, and a second process for receiving information transmitted from another mobile or the fixed station and determining according to its own state for authentication whether the authentication should be done using either one of a message authentication code and a digital signature included in the received information, to thereby perform the authentication.

As with the paragraph 1, it is possible to perform message authentication within the allowable time regardless of the magnitude of the number of messages and perform high-accuracy message authentication in a range for which the allowable time allows. Further, the authentication based on the message authentication code can be performed by appropriately obtaining the necessary common key.

[13] In the authentication processing method according to the paragraph 12, the second process is a process for executing an authentication request generating function assuming a value indicative of the state to be an argument to thereby generate an authentication required value. The authentication required value is data indicative of whether an authentication process using a message authentication code is necessary or not, and whether an authentication process using a digital signature is necessary or not.

[14] In the authentication processing method according to the paragraph 13, the value indicative of the state is a value corresponding to a state of a load of a central processing unit that performs an authentication process as a reception side.

[15] In the authentication processing method according to the paragraph 14, when the load of the central processing unit is large, the second process determines to need the authentication process using the message authentication code and not to need the authentication process using the digital signature. When the load of the central processing unit is low, the second process determines not to need the authentication process using the message authentication code and to need the authentication process using the digital signature.

[16] In the authentication processing method according to the paragraph 13, the value indicative of the state is a value corresponding to the strength and weakness of a correlation between information newly received as a target for the authentication process and history information about communications already received and subjected to the completion of the authentication process.

[17] In the authentication processing method according to the paragraph 16, when the correlation is strong, the second process determines to need the authentication process using the message authentication code and not to need the authentication process using the digital signature. When the correlation is weak, the second process determines not to need the authentication process using the message authentication code and to need the authentication process using the digital signature.

[18] In the authentication processing method according to the paragraph 13, the value indicative of the state is a value corresponding to a relation of distance to another mobile or a fixed station on the transmission side.

[19] In the authentication processing method according to the paragraph 18, when the relation of distance is established far, the second process determines to need the authentication process using the message authentication code and not to need the authentication process using the digital signature. When the relation of distance is established close, the second process determines not to need the authentication process using the message authentication code and to need the authentication process using the digital signature.

[20] In the authentication processing method according to the paragraph 19, the second process generates the relation of distance, based on sensor information acquired by a sensor device of the self-driven mobile or based on a result of processing of communication data received by a communication application of the self-driven mobile.

[21] The authentication processing method according to the paragraph 12 further includes a third process for outputting a request for the message authentication code from the self-driven mobile and receiving by the self-driven mobile, the message authentication code issued by an authentication authority receiving the request therein when the authentication authority performs an authentication process in response to the request to thereby determine validity thereof.

[22] In the authentication processing method according to the paragraph 21, the message authentication code is encrypted by a public encryption key method. Further, the third process includes a process for decrypting the received message authentication code.

2. Further Detailed Description of the Embodiments

Embodiments will be explained in further detail.

A mode for carrying out vehicle-to-vehicle wireless communications in a system to which a communication data authentication method according to the present invention is applied is shown in FIG. 1.

While the vehicle-to-vehicle wireless communication system is not limited in particular, it is comprised of an area authentication authority 100, a typically-illustrated vehicle A 110, and a vehicle B 120.

The vehicle A 110 is equipped with an antenna 111 for wireless communication, a vehicle communication device 113, a display device 112 which displays various information such as navigation to a driver that drives the vehicle A, and an in-vehicle sensor device 114 which measures in-vehicle and out-vehicle information. The in-vehicle sensor device 114 can particularly be equipped with a global positioning system (GPS), a gyroscope, a compass, a gyro-compass, a speed sensor, etc. The GPS measures the latitude and longitude of a vehicle and the time, the gyroscope measures the acceleration and angle of the vehicle, the compass and gyrocompass measure the direction of movement of the vehicle, and the speed sensor measures the velocity of the vehicle. The vehicle communication device 113 has a communication function for communicating with other vehicles, an area authentication authority and other network.

The vehicle B 120 is also equipped with a communication antenna 121, a vehicle communication device 123, a display device 122 and an in-vehicle sensor 124 which respectively have functions equivalent to the above.

The area authentication authority is a certificate or authentication authority for supporting the function of part of vehicle-to-vehicle authentication to be described later.

Figure 2:
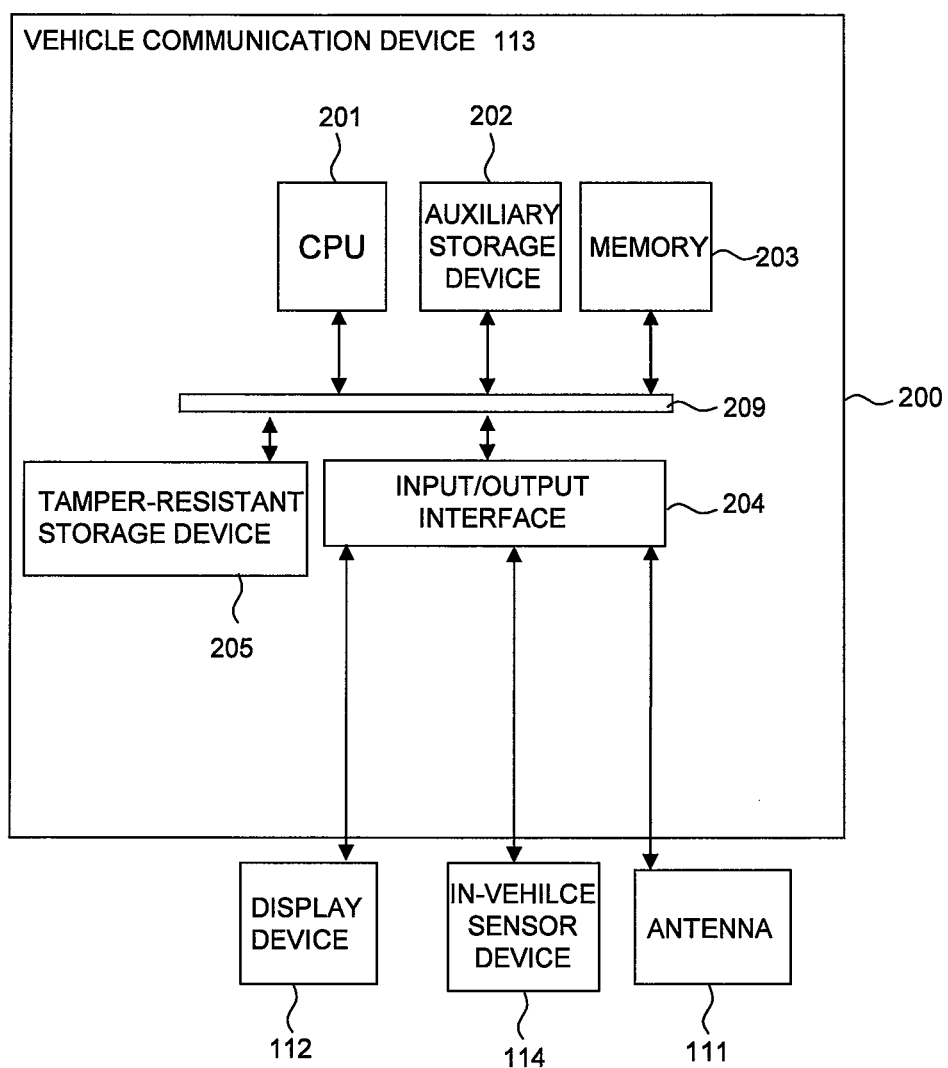
FIG. 2 is a block diagram illustrating by example, a configuration of a vehicle communication device.

FIG. 2 is a block diagram illustrating by example, the configuration of the vehicle communication device 113. The vehicle communication device 113 includes a central processing unit (CPU) 201 which decodes fetched instructions and sequentially executes the instructions, an auxiliary storage device 202, a memory 203, an input/output interface 204, and a tamper-resistant storage device 205 all of which are linked by an internal signal line 209 such as a bus, and is coupled to the antenna 111, the in-vehicle sensor device 114 and the display device 112 via the input/output interface 204. The memory 203 is used in a work area of the CPU 201, and the like. The tamper-resistant storage device is a memory in which confidentiality protection of memory information has been made on a hardware basis or a software basis. A secret key, other control data and the like to be described later are stored therein. An operation program descriptive of an instruction to be executed by the CPU is stored in, for example, the tamper-resistant storage device 205 or the auxiliary storage device 202. When the CPU 201 executes the operation program, a required program module is extended to the memory 203. Wireless communication applications are contained in the operation program. As the wireless communication applications, may be mentioned an application which generates a message that each vehicle transmits to another vehicle or a roadside base station, an application which determines a process on a message received from another vehicle or the roadside base station, and further an application which performs the transmission/reception of mutual position information and velocity information by vehicle-to-vehicle wireless communications to carry out anti-collision and collision avoidance, etc.

The vehicle communication device 200 transmits a message with a message authentication code and a digital signature attached thereto in the transmission/reception of messages between vehicles, i.e., vehicle-to-vehicle communications and performs authentication using either one of the message authentication code and digital signature received from another vehicle or both thereof according to the additional situation and communication histories of the CPU 201 with respect to the message authentication coded and the digital signature, or performs control such as the omission of authentication, etc. without using both thereof. This authentication process will be described below in detail. A secret key used to generate a digital signature and a common key used to generate a message authentication code are stored in, for example, the tamper-resistant storage device 205. Some of messages or all history information received through vehicle-to-vehicle wireless communications are cached in the memory 203.

Figure 3:
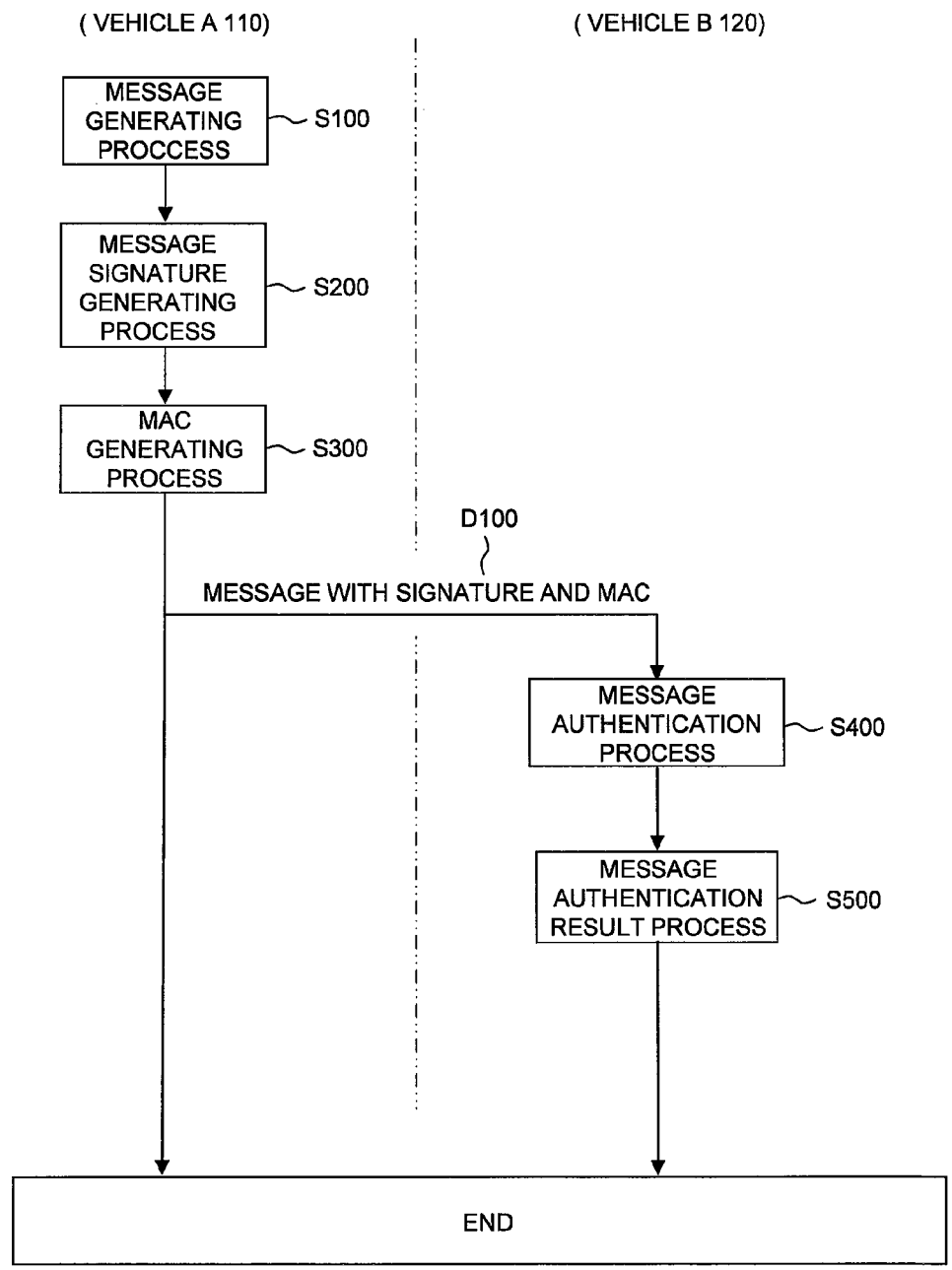
FIG. 3 is a flowchart illustrating a process for transmitting a message with a digital signature and a message authentication code from a vehicle A to a vehicle B.

A processing flow for transmitting a message with a digital signature and a message authentication code attached thereto from the vehicle A 110 to the vehicle B 120 is illustrated by example in FIG. 3. The message authentication code is also simply described as MAC in the following description.

For example, the vehicle A 110 performs a message generating process (S100) to generate a message to be transmitted. Next, the vehicle A 110 performs a message signature generating process (S200) for generating a digital signature, on the message generated in the message generating process (S100) and thereby generates the digital signature to the message.

Further, the vehicle A 110 performs a MAC generating process (S300) for generating a message authentication code, on the message generated in the message generating process (S100) to thereby generate a message authentication code (MAC value) to the message.

The vehicle A 110 links the signature generated in the message signature generating process (S200) and the MAC value generated in the MAC generating process (S300) to the message generated in the message generating process (S100) and transmits the message (D100) with the signature and the MAC value attached thereto. The message with the signature and the MAC value indicates an overall bit string in which a bit string with a digital signature using a public key and a bit string for a MAC value as a message authentication code using a common key are linked to a bit string of data of the message generated by the wireless communication application. For example, it has a data format shown in FIG. 11. Although not limited in particular, a vehicle ID is applied to the message as information for specifying or identifying a data's source vehicle in FIG. 11.

Next, the vehicle B 120 having received the message (D100) with the signature and the MAC performs a message authentication process (S400) and generates a result of signature verification and a result of MAC value verification with respect to the received message (D100) with the signature and the MAC.

Next, the vehicle B 120 performs a message authentication result process (S500) on the signature verification result and the MAC value verification result generated in the message authentication process (S400) and outputs a message authentication result, thereby leading to the completion of a reception process.

Figure 4:
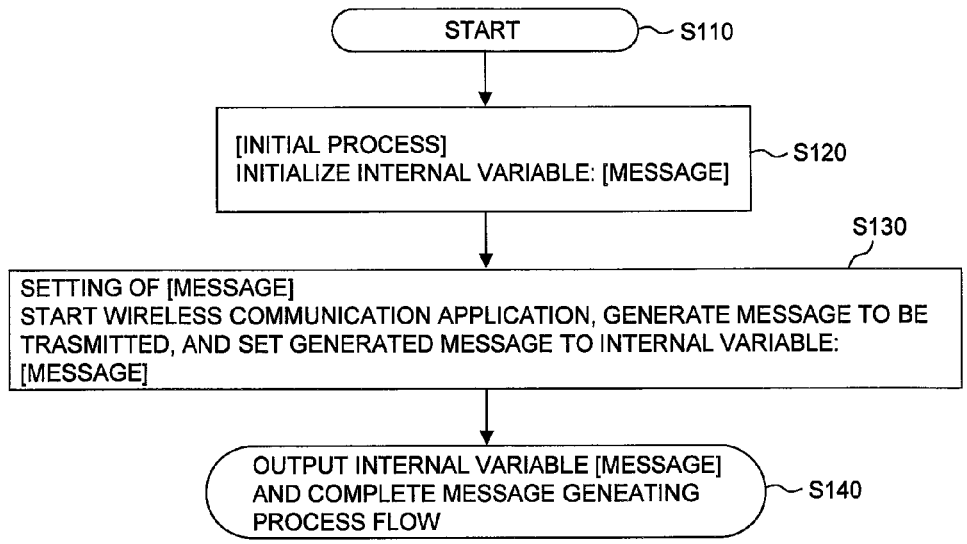
FIG. 4 is a flowchart illustrating a concrete example of a message generating process (S100)

A concrete example of the message generating process (S100) is shown in FIG. 4.

When the vehicle A 110 that performs the message generating process starts the message generating process (S110), it initializes an internal variable: [message] assigned to a variable region in the memory 203 or the like (S120). Next, the vehicle A 110 starts a wireless communication application, generates a message to be transmitted and sets the generated message to the internal variable: [message] (S130). Last, the vehicle A 110 outputs the internal variable: [message] and completes the message generating process (S140).

Figure 5:
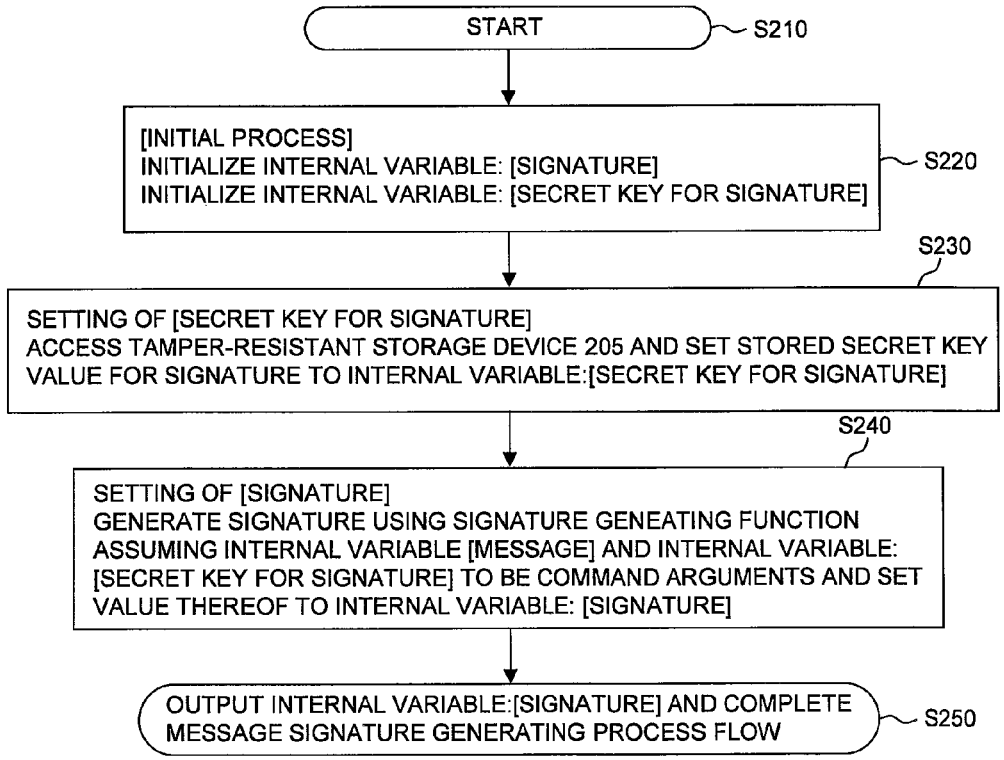
FIG. 5 is a flowchart illustrating a concrete example of a message signature generating process (S200)

A concrete example of the message signature generating process (S200) is shown in FIG. 5.

When the vehicle A 110 that performs the message signature generating process starts the message signature generating process (S210), the vehicle A 110 initializes an internal variable: [signature] and an internal variable: [secret key for signature] (S220). Next, the vehicle A 110 obtains access to the tamper-resistant storage device 205 and sets the value of a stored secret key for the digital signature generation (signature secret key value) to the internal variable: [secret key for signature] (S230). Next, the vehicle A 110 generates a digital signature (also described simply signature) by using a signature generating function assuming each of the internal variable: [message] and the internal variable: [secret key for signature] to be a command argument and sets its value to the internal variable: [signature] (S240). Last, the vehicle A 110 outputs the internal variable: [signature] and completes the message signature generating process (S250).

The signature generating function is generically called a public key encryption function for outputting a signature, assuming each of a message target for signature and a secret key value for signature to be a command argument. As the signature generating function, may be mentioned, for example, an ECDSA (Elliptic Curve Digital Signature Algorithm), an RSA signature, an ElGamal signature or the like.

Figure 6:
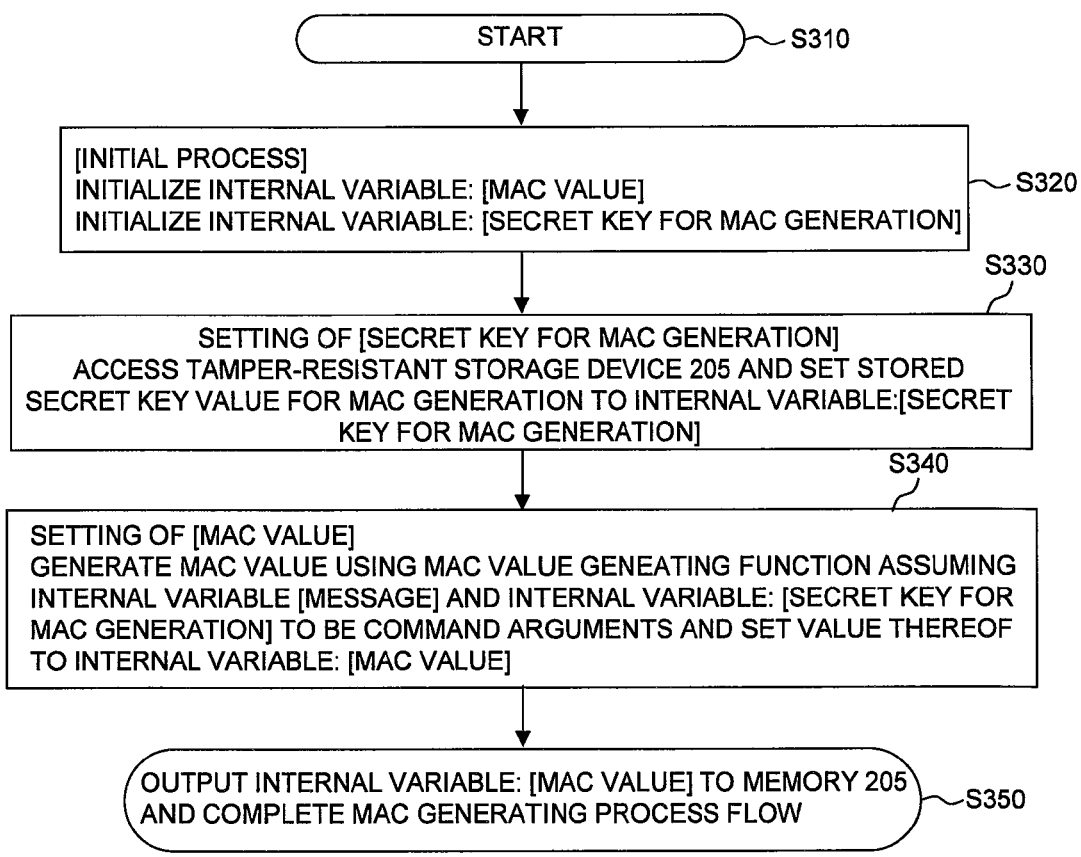
FIG. 6 is a flowchart illustrating a concrete example of a MAC generating process (S300)

A concrete example of the MAC generating process (S300) is shown in FIG. 6.

When the vehicle A 110 that performs the MAC generating process starts the MAC generating process (S310), it initializes an internal variable: [MAC value] and an internal variable: [secret key for MAC generation] (S320). Next, the vehicle A 110 obtains access to the tamper-resistant storage device 205 and sets the value of the secret key (secret key value for MAC generation) being the stored common key for MAC generation to the internal variable: [secret key for MAC generation]. The vehicle A 110 generates a MAC value by using a MAC value generating function assuming each of the internal variable: [message] and the internal variable: [secret key for MAC generation] to be a command argument and sets its value to the internal variable: [MAC value] (S330). Last, the vehicle A 110 outputs the internal variable: [MAC value] and completes the MAC generating process (S340).

The MAC value generating function means an encryption function which takes a target message and a secret key value for MAC generation as command arguments and outputs a MAC value, e.g., an HMAC (Keyed-Hashing for Message Authentication code) encryption function.

Figure 7:
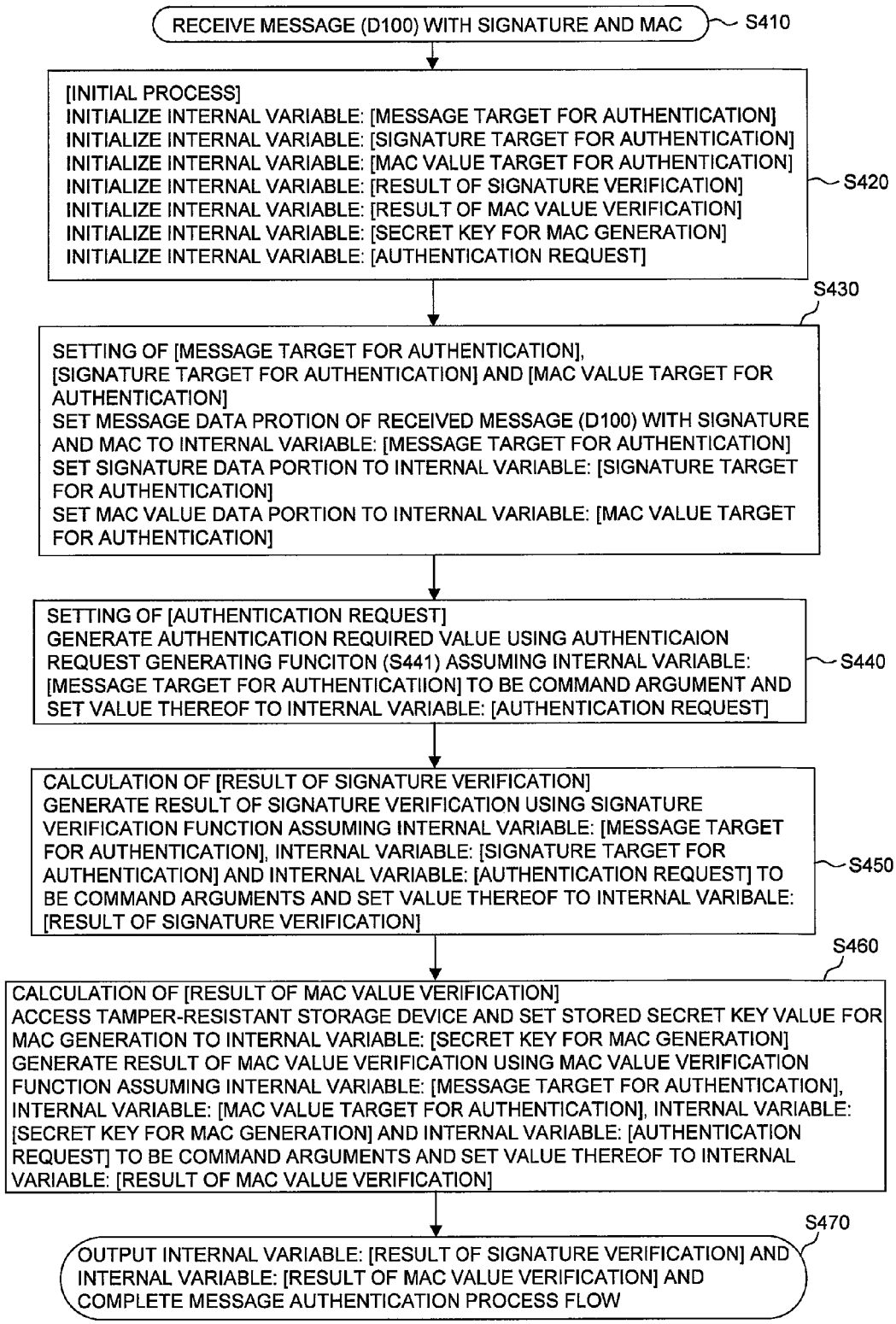
FIG. 7 is a flowchart illustrating a concrete example of a message anthentication process (S400)

A concrete example of the message authentication process (S400) is shown in FIG. 7.

The vehicle B 120 that performs the message authentication process receives the message (D100) with the signature and MAC transmitted by the vehicle A 110 (S410). Next, the vehicle B 120 initializes an internal variable: [message target for authentication], an internal variable: [signature target for authentication], an internal variable: [MAC value target for authentication], an internal variable: [result of signature verification], an internal variable: [result of MAC value verification], an internal variable: [secret key for MAC generation], and an internal variable: [authentication request] (S420).

Next, the vehicle B 120 sets a data portion of the received message (D100) with the signature and MAC to the internal variable: [message target for authentication], sets a data portion of signature to the internal variable: [signature target for authentication], and sets a data portion of a MAC value to the internal variable: [MAC value target for authentication] (S430).

Next, the vehicle B 120 generates an authentication required value using an authentication request generating function assuming the internal variable: [message target for authentication] to be a command argument (S441), and sets its value to the internal variable: [authentication request] (S440).

The authentication request generating function is a function in which a vehicle having received a message assumes a message target for authentication to be a command argument and outputs data of 2 bits indicative of whether signature verification is necessary or not, and whether MAC value verification is necessary or not, as an authentication request. Its output value is an authentication required value. The authentication required value means "no need for signature verification" and "no need for MAC value verification" if it is 00. The authentication required value means "need for signature verification" and "no need for MAC value verification" if it is 10. The authentication required value means "no need for signature verification" and "need for MAC value verification" if it is 01. The authentication required value means "need for signature verification" and "need for MAC value verification" if it is 11. In the verification process that has gain the support of "no need for verification", although not limited in particular, the result of "verification success" is generated without performing the verification process. Incidentally, the amount of calculation taken for the verification is minimum where the authentication required value is 00. Subsequently, the authentication required value increases in the order of 01, 10 and 11 and is maximum where the authentication required value is given as 11.

Next, the vehicle B 120 generates a signature verification result according to the authentication required value by using the signature verification function assuming each of the internal variable: [message target for authentication], the internal variable: [signature target for authentication], and the internal variable: [authentication request] to be a command argument, and sets its value to the internal variable: [result of signature verification] (S450).

The signature verification function means a function which verifies an electronic signature using a public key certificate with each of the message target for authentication, the signature target for authentication and the authentication request being taken as the command argument, outputs 0 as the value of the signature verification result if a verification success is made, and outputs 1 if a verification failure is made. When the verification required value is however 00 or 01, it is assumed to be "no need for signature verification" and 0 is always outputted.

Next, the vehicle B 120 obtains access to the tamper-resistant storage device to set the stored secret key value for MAC generation to the internal variable: [secret key for MAC generation], generate a MAC value verification result according to the authentication required value by using a MAC value verification function assuming each of the internal variable: [message target for authentication], internal variable: [MAC value target for authentication], internal variable: [secret key for MAC generation] and internal variable: [authentication request] to be a command argument, and to set the value thereof to the internal variable: [result of MAC value verification] (S460).

The MAC value verification function means a function for determining that a verification success is established when the MAC value based on the HMAC encryption function assuming each of the above message target for authentication, secret key value for MAC generation, MAC value target for authentication and verification request to be the command argument coincides with the MAC value of the message target for verification and thereby outputting 0 as a MAC value verification result, and for determining that a verification failure is established when they do not coincide with each other and thereby outputting 1 as a MAC value verification result. When the verification required value is however 00 or 10, it is assumed to be "no need for MAC value verification" and 0 is always outputted.

Last, the vehicle B 120 outputs the internal variable: [result of signature verification] and the internal variable: [result of MAC value verification] and completes the above process (S470).

Figure 8:
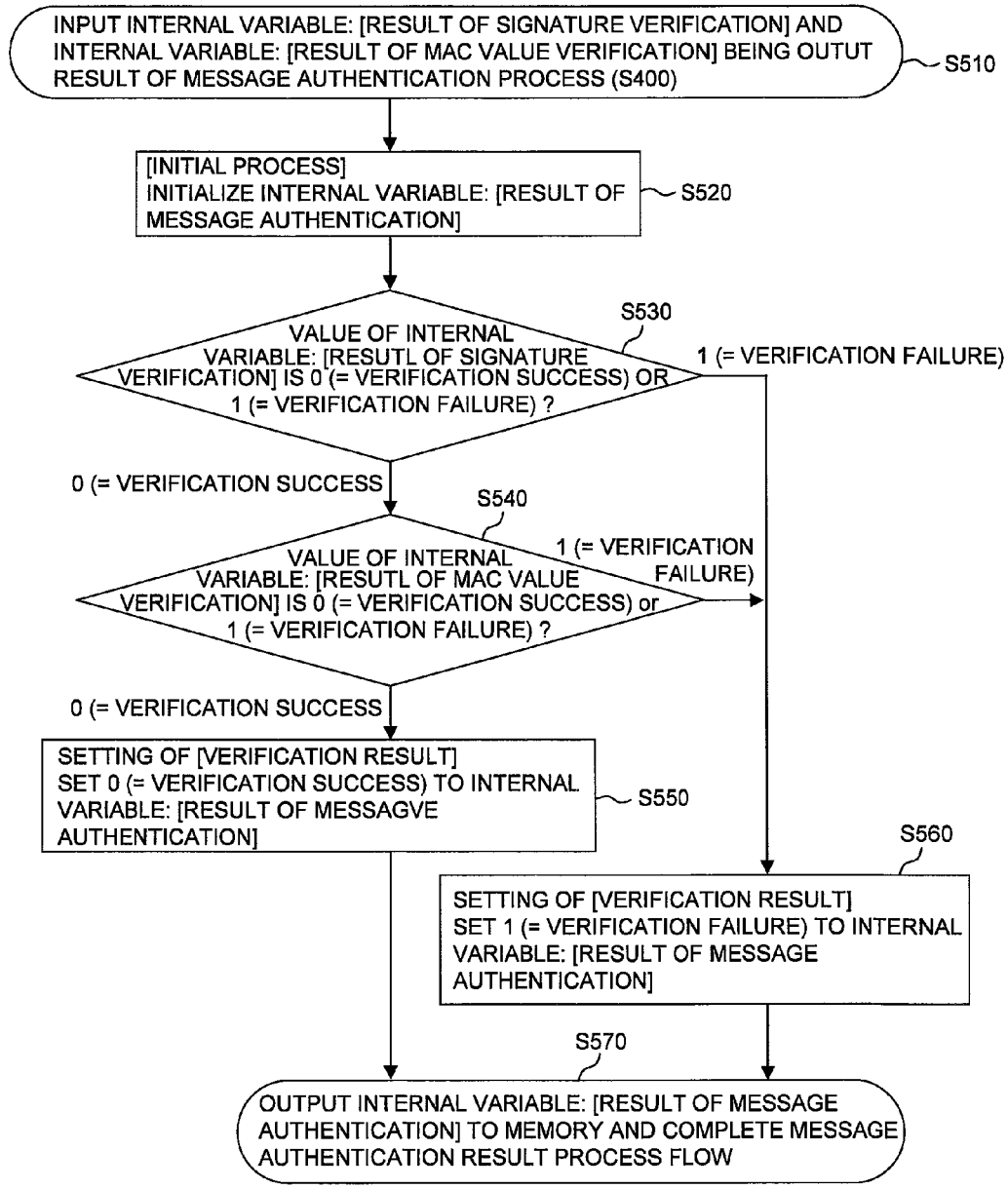
FIG. 8 is a flowchart illustrating a concrete example of a message authentication result process (S500)

FIG. 8 shows a concrete example of the message authentication result process (S500).

The vehicle B 120 that performs the message authentication result process (S500) inputs the internal variable: [result of signature verification] and internal variable: [result of MAC value verification] (S510) indicative of the output result of the message authentication process (S400) and initializes the internal variable: [result of message authentication] (S520).

Then, the vehicle B 120 determines whether the values of the internal variable: [result of signature verification] and the internal variable: [result of MAC value verification] are both 0 (=verification success) (S530 and S540). If both are taken as the verification success, the vehicle B 120 sets 0 (=verification success) to the internal variable: [result of message verification] (S550). If either one of the verification results is 1 (=verification success), then the vehicle B 120 sets 1 (=verification failure) to the internal variable: [result of message authentication] (S560). Last, the vehicle B 120 outputs the internal variable: [result of message verification] to the memory and completes the above process (S570).

Figure 9:
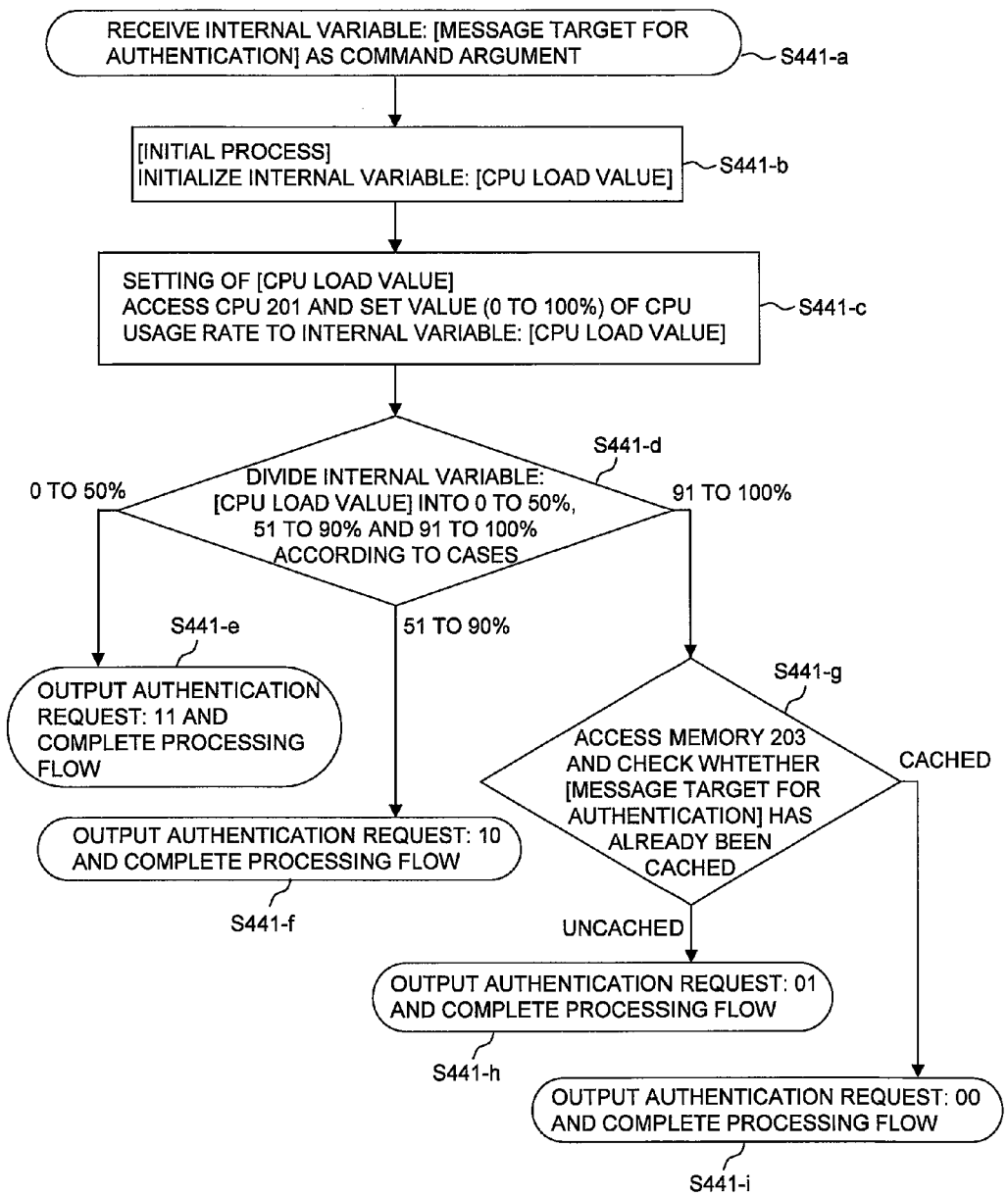
FIG. 9 is a flowchart illustrating a process for generating an authentication required value by an authentication request generating function.

A processing flow for generating the authentication required value by the authentication request generating function is illustrated by example in FIG. 9.

The vehicle B 120 that performs the authentication request generation (S441) receives an internal variable: [message target for authentication] as a command argument (S441-a). Next, the vehicle B 120 initializes an internal variable: [CPU load value] (S441-b) and obtains access to the CPU 201 to set the value (0 to 100%) of a CPU usage rate to the internal variable: [CPU load value] (S441-c) and divide the internal variable: [CPU load value] into three types of 0 to 50%, 51 to 99% and 91 to 100% according to the cases (S441-d).

When the internal variable: [CPU load value] ranges from 0% to 50%, the vehicle B 120 outputs 11 as the authentication required value and completes the process (S441-e). When the internal variable: [CPU load value] ranges from 51% to 90%, the vehicle B 120 outputs 10 as the authentication required value and completes the process (S441-f). When the internal variable: [CPU load value] ranges from 91% to 100%, the vehicle B 120 further obtains access to the memory 203 lying inside the vehicle communication device 123 to check whether a message target for authentication having a vehicle ID coincident with a vehicle ID of a message target for authentication processing has already been cached (S441-g). If the message is found not to have been cached, the vehicle B 120 outputs 01 as the authentication required value and completes the process (S441-h). If the message is found to have been cached, then the vehicle B 120 outputs 00 as the authentication required value and completes the process (S441-i).

According to the authentication request generating process, the higher the internal variable: [CPU load value], the smaller the amount of calculation taken for message verification corresponding to the authentication request. Further, when the CPU load is high, the authentication process is not performed on a message sent from the same vehicle as the source of the authentication-processed message, and the CPU load can be sorted to the authentication process with respect to the message of another vehicle.

Figure 10:
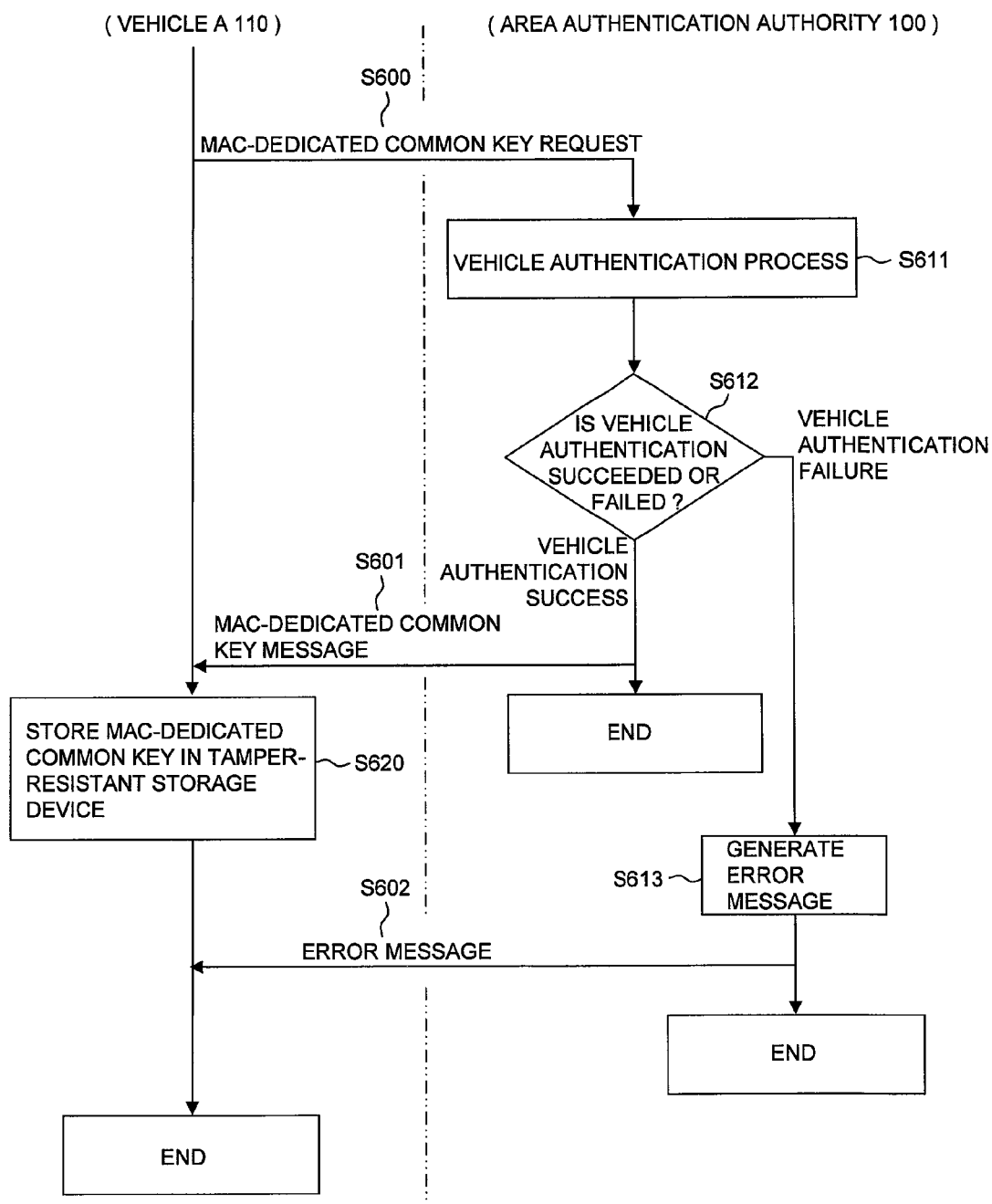
FIG. 10 is a flowchart illustrating a method of obtaining a secret key (MAC-dedicated common key) used as a common key used in MAC value verification.

A flow for processing a method of obtaining a secret key (MAC-dedicated common key) used as a common key used in MAC value verification is illustrated by example in FIG. 10. A vehicle obtains the MAC-dedicated common key signification in an area of the area authentication authority 100 such as a highway network, a municipality or the like from the area authentication authority 100.

In FIG. 10, for example, the vehicle A 110 regularly issues a request 600 for the MAC-dedicated common key. The request 600 for the MAC-dedicated common key is accompanied with a digital signature generated by the vehicle A 110, for example. The area authentication authority 100 having received the request 600 decrypts the digital signature in response to the request 600 to perform a vehicle authentication process (S611). When the authentication of the vehicle has succeeded, the area authentication authority 10 returns a message 601 of the MAC-dedicated common key for the corresponding area to the vehicle A 110. The communication message 601 of the MAC-dedicated common key is encrypted and protected by, for example, a public encryption key method. The vehicle A 110 receives and decrypts the message 601 to thereby acquire the MAC-dedicated common key and stores it in the tamper-resistant storage device 205. When the authentication of the vehicle has failed at Step S612, the area authentication authority 10 generates an error message (S613) and returns the error message 602 to the vehicle A 110, thereby completing the process. The MAC-dedicated common key can be acquired in a wide range of areas by the process of FIG. 10.

According to the above embodiment, the following operative effects can be obtained.

(1) The authentication process using the digital signature relatively large in the load of data processing, and the authentication process using the message authentication code relatively low in the load of the data processing can be used properly according to its own state for authentication in a range for which the time allowable for the authentication process allows. It is thus possible to perform the message authentication within the allowable time regardless of the magnitude of the number of messages and perform message authentication high in accuracy in the range for which the allowable time allows.

(2) Since the authentication using the digital signature is available, the common key necessary for the message authentication code can also be received from outside through the message encrypted by the public key encryption method as described based on FIG. 10. Hence, the authentication based on the message authentication code can be performed by appropriately obtaining the necessary common key.

(3) The authentication request generating function assuming the value indicative of the above state to be an argument is executed to thereby generate the authentication required value being data indicative of whether the authentication process using the message authentication code is necessary or not and whether the authentication process using the digital signature is necessary or not, so that control on which authentication process should be done becomes easy.

(4) The state of the load of the central processing unit is used as a criterion for determination as to which of authentication processes should be done, thereby making it possible to plainly determine the authentication process that is within the time allowable for the authentication process.

(5) The strength and weakness of the correlation between the newly-received information and the history information about the communications already received and subjected to the completion of the authentication process are used as a criterion for determination as to which of authentication processes should be done, whereby the substantially needless authentication process is omitted to make it easy to sort the load of the CPU to another authentication process.

(6) The value corresponding to the relation of distance to another mobile or the fixed station on the transmission side is used as a criterion for determination as to which of authentication processes should be done, whereby the substantially needless authentication process relative to the grasped meaningless one like the distant vehicle at the collision avoidance process or the like is omitted, and control on the sorting of the load of the CPU to another authentication process becomes easy.

Although the invention made above by the present inventors has been described specifically on the basis of the preferred embodiments, the present invention is not limited to the embodiments referred to above. It is needless to say that various changes can be made thereto within the scope not departing from the gist thereof.

Although the ECDSA has been illustrated by example above as the signature method in the above, for example, it is not necessarily required to be the ECDSA. Any signature method capable of message authentication is employable. Likewise, although the HMAC method is illustrated by example as the high-speed message authentication method, it is not necessarily required to be the HMAC method. Any common key authentication method capable of message authentication is employable.

Although the above embodiment illustrates where the two vehicles perform the vehicle-to-vehicle wireless communications, the number of vehicles is not necessarily limited to the two. A plurality of vehicles or a similar message authentication method may be used inclusive of a roadside base station. In this case, as described in FIG. 10, there is a need to share the MAC generating secret key for HMAC in advance between vehicles all in the communication range and the roadside base station. At this time, the pre-sharing method for the secret key for the MAC generation may be arbitrary, but is not limited to the configuration method which performs in advance, anthentication with the authentication authority that manages the specific range and thereby receive the secret key for MAC generation as described in FIG. 10.

Even in addition to the above, although the present embodiment has illustrated as the authentication request generating function, the function which reduces the amount of calculation necessary for message verification as the CPU load becomes larger, only the CPU load is not necessarily required to be taken as the reference or criterion for the authentication request generation. For example, when the linking between the result of past message authentication and a vehicle ID is cached and new message data is received where the vehicle ID is included in message data, an authentication request may be generated with the vehicle ID and cache data as command arguments. More generally, the authentication request may be generated using related arts such as cache processing, a session ID, a session key and the like used in message authentication on a web server or the like.

When present position information about the latitude and longitude of a message transmission vehicle and velocity information are contained in message data as an example of the authentication request generating function, the vehicle B 120 side may estimate the present position of the vehicle A 110 from message data acquired in advance and generate an authentication request with the present position information and the estimated present position as command arguments upon the generation of the authentication request. For example, when a communications partner is far beyond a constant limit, authentication may not be done. When the communications partner is relatively far, the MAC value verification may be performed. When the communications partner is relatively near, the signature verification may be performed. As an example of the authentication request generating function, when a collision avoidance application makes use of message data, the degree of importance of a message transmitted by a nearby vehicle is high and the degree of importance of a message transmitted by a faraway vehicle is low. In this case, adaptation to a reduction in the amount of calculation for an authentication request with respect to the message of the faraway vehicle is considered to avoid taking resources in the authentication of the message transmitted by the faraway vehicle. For example, a wireless communication application may calculate the degree of importance on each message data and use the calculated degree of importance as a command argument at the authentication request generation.

INDUSTRIAL APPLICABILITY

The present invention can widely be applied to a wireless communications device technology that performs an authentication process at a self-driven mobile which performs wireless communications with another mobile or a fixed station.

EXPLANATION OF REFERENCE NUMERALS 100 area authentication authority
110 vehicle A
120 vehicle B
113 vehicle communication device
112 display device
114 in-vehicle sensor device
123 vehicle communication device
122 display device
124 in-vehicle sensor
201 central processing unit (CPU)
202 auxiliary storage device
203 memory
204 input/output interface
205 tamper-resistant storage device
209 internal signal line

What is claimed is:

1. A wireless communications device which performs an authentication process at a self-driven vehicle that performs wireless communications with another vehicle or a fixed station, said wireless communications device comprising:
a central processing unit;
a memory coupled to the central processing unit; and
an input/output interface coupled to the central processing unit;
wherein the memory stores instructions that, when executed by the central processing unit, cause the central processing unit to perform a first process and a second process,
wherein the first process includes generating a message authentication code of communication data using a common key shared between the self-driven vehicle and the other vehicle or the fixed station, generating a digital signature using a secret key inherent in the self-driven vehicle itself, generating position information of the self-vehicle, and transmitting the communication data with each of the generated message authentication code, the generated digital signature, and the position information of the self-vehicle added thereto via the input/output interface,
wherein the second process includes receiving information transmitted from the other vehicle or the fixed station via the input/output interface including position information of the other vehicle or the fixed station, and determining whether authentication is to be performed with one or more of a message authentication code and a digital signature which are both included in the received information,
wherein the second process includes generating an authentication required value by executing an authentication request generating function according to a load state of the central processing unit and a distance of the self-vehicle from the other vehicle or the fixed station based on the position information of the other vehicle or the fixed station,
wherein the authentication required value indicates whether a first authentication process using the received digital signature is to be executed for the received information, and whether a second authentication process using the received message authentication code is to be executed for the received information,
wherein the load state is one of a first load state, a second load state indicating that a load of the central processing unit is heavier than that of the first load state, and a third load state indicating that the load of the central processing unit is heavier than that of the second load state,
wherein the central processing unit generates, when the central processing unit is in the first load state, the authentication required value to indicate the first authentication process and the second authentication process are both to be executed,
wherein the central processing unit generates, when the central processing unit is in the second load state and the distance is less than a first value and less than a second value, the authentication required value to indicate the first authentication process is to be executed and the second authentication process is not to be executed,
wherein the central processing unit generates, when the central processing unit is in the second load state and the distance is greater than the first value and less than the second value, the authentication required value to indicate the first authentication process is not to be executed and the second authentication process is to be executed, wherein the central processing unit generates, when the central processing unit is in the second load state and the distance is greater than the first value and greater than the second value, the authentication required value to indicate the first authentication process and the second authentication process are both not to be executed, and wherein the central processing unit checks, when the central processing unit is in the third load state, whether a vehicle ID of the received information has been cached in the memory, and the central processing unit generates the authentication required value to indicate the first authentication process is not to be executed and the second authentication process is to be executed when the vehicle ID is not cached in the memory, and to indicate the first authentication process and the second authentication process are both not to be executed when the vehicle ID is cached in the memory, and wherein the central processing unit executes the first authentication process and the second authentication process as indicated by the authentication required value.

2. The wireless communications device according to claim 1, wherein the central processing unit further controls a third process, wherein the third process includes transmitting a request for the common key accompanied by the generated digital signature via the input/output interface, and receiving the common key from an authentication authority, which received the request and performed an authentication process in response to the request to thereby determine validity of the self-driven vehicle with the generated digital signature, via the via input/output interface.

3. The wireless communications device according to claim 2, wherein the message authentication code is encrypted by a public encryption key method, and wherein the third process further includes decrypting the received common key.

4. An authentication processing method executed by a central processing unit in a self-driven vehicle that performs wireless communications with another vehicle or a fixed station, said authentication processing method comprising:

a first process of generating a message authentication code of communication data using a common key shared between the self-driven vehicle and the other vehicle or the fixed station, generating a digital signature using a secret key inherent in the self-driven vehicle itself, generating position information of the self-vehicle, and transmitting the communication data with each of the generated message authentication code, the generated digital signature, and the position information of the self-vehicle added thereto; and a second process of receiving information transmitted from the other vehicle or the fixed station including position information of the other vehicle or the fixed station, and determining whether authentication is to be performed with one or more of a message authentication code and a digital signature which are both included in the received information, wherein the second process further includes generating an authentication required value by executing an authentication request generating function according to a load state of the central processing unit and a distance of the self-vehicle from the other vehicle or the fixed station based on the position information of the other vehicle or the fixed station, wherein the authentication required value indicates whether a first authentication process using the received digital signature is to be executed for the received information, and whether a second authentication process using the received message authentication code is to be executed for the received information, wherein the load state is one of a first load state, a second load state indicating that the load of the central processing unit is heavier than that of the first load state, and a third load state indicating that the load of the central processing unit is heavier than that of the second load state, wherein, when the central processing unit is in the first load state, the authentication required value is generated to indicate the first authentication process and the second authentication process are both to be executed, wherein, when the central processing unit is in the second load state and the distance is less than a first value and less than a second value, the authentication required value is generated to indicate the first authentication process is to be executed and the second authentication process is not to be executed, wherein, when the central processing unit is in the second load state and the distance is greater than the first value and less than the second value, the authentication required value to indicate the first authentication process is not to be executed and the second authentication process is to be executed, wherein, when the central processing unit is in the second load state and the distance is greater than the first value and greater than the second value, the authentication required value to indicate the first authentication process and the second authentication process are both not to be executed, wherein, when the central processing unit is in the third load state, when a vehicle ID of the received information has not been cached, the authentication required value is generated to indicate the first authentication process is not to be executed and the second authentication process is to be executed, and, when the vehicle ID of the received information has been cached, the authentication required value is generated to indicate the first authentication process and the second authentication process are both not to be executed, and wherein the central processing unit executes the first authentication process and the second authentication process as indicated by the authentication required value.

5. The authentication processing method according to claim 4, further including a third process for transmitting a request for the common key accompanied by the generated digital signature from said self-driven vehicle, and receiving the common key from an authentication authority, which received the request and performed an authentication process in response to the request to thereby determine validity of the self-driven vehicle with the generated digital signature.

6. The authentication processing method according to claim 5, wherein the message authentication code is encrypted by a public encryption key method, and wherein the third process further includes decrypting the received common key.

7. The wireless communications device according to claim 1, wherein the memory stores instructions that, when executed by the central processing unit, cause the central processing unit to perform the first process.

8. The wireless communications device according to claim 1, wherein the memory stores instructions that, when executed by the central processing unit, cause the central processing unit to perform the second process.

9. The wireless communications device according to claim 1, wherein the memory is a tamper-resistant storage device, and the secret key and the common key are stored in the tamper-resistant storage device.

10. The wireless communications device according to claim 1, wherein the second process further includes performing the first authentication process and the second authentication process when indicated by the authentication required value.

11. The authentication processing method according to claim 4, wherein the secret key and the common key are stored in a tamper-resistant storage device of the self-driven vehicle.

12. The authentication processing method according to claim 4, wherein the second process further includes performing the first authentication process and the second authentication process when indicated by the authentication required value.

* * * * *